Patented Sept. 22, 1953

2,653,104

UNITED STATES PATENT OFFICE 2,653,104

PUFFED CORN PRODUCT AND METHOD OF MAKING THE SAME

Charles R. Carman, Park Forest, Ill., assignor to Guardite Corporation, a corporation of Delaware No Drawing. Application December 4, 1951, Serial No. 259,889

3 Claims. (Cl. 99—82)

This invention relates to a puffed corn product and particularly one suitable for subsequent French frying.

The corn is puffed to approximately 3½ times its original size without caramelization. Upon French frying and salting, it becomes a very tasteful product having a crisp, chewy texture. The preferred material is cracked waxy maize corn (or field corn). The granules are approximately half of the original kernel size and normally it is preferred that the corn should pass through a quarter inch mesh sieve and be retained on a No. 4 standard sieve, which is slightly less than a $\frac{3}{16}$ inch opening. The moisture content of the raw material is approximately 10%.

The cracked material without any tempering (that is without addition of liquid water) is placed in a sealed vessel and evacuated for two minutes, the final pressure being approximately $\frac{1}{10}$ inch mercury absolute. Steam is then admitted to the vessel to bring the pressure rapidly to 100 pounds per square inch gauge, the pressure being held at this point for two minutes. During the steaming operation, a purge line is maintained in open condition so that any condensed water and non-condensable gas in the steam or generated by the corn might be withdrawn. Details of an apparatus adapted for such use is shown in Doyle application No. 125,668 filed November 5, 1949, now Patent No. 2,627,221, and Baer application No. 189,679, filed October 11, 1950, now abandoned.

After steaming at 100 pounds for two minutes, the pressure is reduced to 50 pounds per square inch gauge in seven seconds by opening a valve line and the material is then puffed into a vacuum chamber of very much larger size than the cooking chamber in which the material has been steamed. The communication between the puffing chamber and the cooking chamber is substantially the entire diameter of the cooking chamber so that reduction in pressure is immediate. The puffing chamber is preferably at about $\frac{2}{10}$ of an inch absolute and pressure therein is not permitted to rise to a point where charring or caramelization of the corn will occur. This caramelization is indicated by the characteristic burnt taste of puffed products of the prior art atmospheric puffing operations.

It is preferred to maintain the walls of the expansion or puffing chamber at a temperature of 150° to 200° F. in order to reduce any stickiness of the corn. However, it is not necessary to dry the puffed material. Any excess moisture is removed in the French frying which occurs later. However, if the corn is to be stored for any great length of time before French frying, it may be desirable to dry it to approximately 10% moisture.

The material is then French fried in the customary manner. The French frying of the material is not part of the present invention. However, the preparation of a puffed product which would produce a satisfactory flavor and texture on French frying was solved by applicant.

The foregoing detailed description is given for clearness of understanding only and no unnecessary limitations should be understood therefrom as modifications will be obvious to those skilled in the art.

I claim:

1. In the preparation of a puffed corn product suitable for French frying the method, which comprises: substantially removing the air from cracked corn; substituting an atmosphere of steam under pressure; maintaining the steam pressure until the cracked corn is in condition for vacuum puffing; then instantaneously reducing the pressure from at least 50 pounds per square inch gauge to a substantial vacuum condition to cause an explosion resulting in puffing of the cracked corn; and maintaining a reduced pressure sufficient to cold set the puffed cracked corn during the explosion and until cold setting of the corn occurs, the pressure at the inception of the explosion and the extent of pressure reduction being correlated to produce a puffed cracked corn product free from a burnt or caramelized taste and about 3½ times the size of the original corn.

2. The method as set forth in claim 1, in which the steaming operation is carried on at a pressure of 100 pounds per square inch gauge for approximately 2 minutes and then the pressure is rapidly reduced to approximately 50 pounds per square inch gauge.

3. A cold set vacuum puffed corn product having a volume of about 3½ times the original cracked corn produced by the method of claim 1.

CHARLES R. CARMAN.

References Cited in the file of this patent

UNITED STATES PATENTS

| Number | Name | Date |
|---|---|---|
| 1,933,158 | Bohn et al. | Oct. 31, 1933 |
| 2,287,737 | Huzenlaub | June 23, 1942 |
| 2,358,251 | Huzenlaub | Sept. 12, 1944 |
| 2,438,939 | Ozai-Durrani | Apr. 6, 1948 |